(12) United States Patent
Stümpert

(10) Patent No.: US 8,320,377 B2
(45) Date of Patent: Nov. 27, 2012

(54) CONNECTIVITY PLANE ROUTING

(75) Inventor: Martin Stümpert, Hochspeyer (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1190 days.

(21) Appl. No.: 10/722,638

(22) Filed: Nov. 26, 2003

(65) Prior Publication Data

US 2004/0156355 A1 Aug. 12, 2004

(30) Foreign Application Priority Data

Dec. 4, 2002 (EP) .................................... 02026957

(51) Int. Cl.
*H04L 12/28* (2006.01)

(52) U.S. Cl. ........ 370/392; 370/310; 370/332; 370/355; 370/401; 370/410; 455/422.1; 455/426.1; 455/436; 455/466

(58) Field of Classification Search .................. 370/349, 370/328, 331, 352, 310, 332, 338, 355, 395.43, 370/401, 410; 455/456–458, 466, 422, 426, 455/436

See application file for complete search history.

(56) References Cited

U.S. PATENT DOCUMENTS

| | | | | |
|---|---|---|---|---|
| 5,577,103 A * | 11/1996 | Foti | ............................ | 455/412.1 |
| 5,579,375 A * | 11/1996 | Ginter | ............................ | 455/417 |
| 6,137,791 A * | 10/2000 | Frid et al. | ........................ | 370/352 |
| 6,353,607 B1 * | 3/2002 | Valentine et al. | ............. | 370/349 |
| 6,421,537 B1 * | 7/2002 | Lamb et al. | .................... | 455/433 |
| 6,490,451 B1 * | 12/2002 | Denman et al. | ................ | 455/436 |
| 6,505,050 B1 * | 1/2003 | Brudos et al. | ................. | 455/458 |
| 6,515,985 B2 * | 2/2003 | Shmulevich et al. | ......... | 370/356 |
| 6,625,420 B1 * | 9/2003 | Naqvi et al. | ..................... | 455/8 |
| 6,625,461 B1 * | 9/2003 | Bertacchi | ....................... | 455/466 |
| 6,650,909 B1 * | 11/2003 | Naqvi et al. | ................... | 455/560 |
| 6,691,164 B1 * | 2/2004 | Hundscheidt et al. | ........ | 709/225 |
| 6,763,233 B2 * | 7/2004 | Bharatia | ....................... | 455/433 |
| 6,795,444 B1 * | 9/2004 | Vo et al. | ........................ | 370/401 |
| 6,871,070 B2 * | 3/2005 | Ejzak | ......................... | 455/435.1 |
| 6,876,646 B1 * | 4/2005 | Dore et al. | .................... | 370/352 |
| 6,925,074 B1 * | 8/2005 | Vikberg et al. | ............... | 370/338 |
| 6,954,441 B2 * | 10/2005 | Musikka | ....................... | 370/328 |
| 6,996,087 B2 * | 2/2006 | Ejzak | ......................... | 370/338 |
| 7,079,521 B2 * | 7/2006 | Holur et al. | .................... | 370/338 |
| 7,190,896 B1 * | 3/2007 | Wang et al. | .................... | 398/30 |
| 7,394,795 B2 * | 7/2008 | Chitrapu et al. | .............. | 370/338 |
| 7,532,568 B1 * | 5/2009 | Boudreaux et al. | ............ | 370/217 |
| 7,539,179 B1 * | 5/2009 | Baird et al. | .................... | 370/356 |
| 7,564,835 B1 * | 7/2009 | Grabelsky et al. | ............ | 370/352 |
| 2001/0043577 A1 * | 11/2001 | Barany et al. | ................. | 370/328 |
| 2001/0053145 A1 * | 12/2001 | Willars et al. | ................. | 370/352 |

(Continued)

FOREIGN PATENT DOCUMENTS

WO   WO 00/33600 A1   6/2000

*Primary Examiner* — Ayaz Sheikh
*Assistant Examiner* — Andrew C Lee

(57) ABSTRACT

A method and device for routing a connectivity plane message to a mobile terminal that can be reached via two or more network nodes of a first type are described. The method includes receiving positional information indicating the geographical location of the mobile terminal, receiving routing information being associated with a network node of a second type to which the mobile terminal is attached, determining, based on the positional information, the network node of the first type via which the connectivity plane message is to be routed to the mobile terminal, and routing the connectivity plane message to the mobile terminal via the selected network node of the first type.

17 Claims, 5 Drawing Sheets

U.S. PATENT DOCUMENTS

| | | |
|---|---|---|
| 2002/0006114 A1* | 1/2002 | Bjelland et al. ............... 370/248 |
| 2002/0042277 A1* | 4/2002 | Smith ............................ 455/456 |
| 2002/0049052 A1* | 4/2002 | Suvanen ........................ 455/422 |
| 2002/0051440 A1* | 5/2002 | Houzel .......................... 370/338 |
| 2002/0080751 A1* | 6/2002 | Hartmaier ..................... 370/338 |
| 2002/0089949 A1* | 7/2002 | Bjelland et al. ............... 370/331 |
| 2002/0167900 A1* | 11/2002 | Mark et al. .................... 370/225 |
| 2002/0169883 A1* | 11/2002 | Bright et al. .................. 709/230 |
| 2002/0181468 A1* | 12/2002 | Lucidarme et al. ........ 370/395.2 |
| 2002/0186663 A1* | 12/2002 | Stumpert et al. .............. 370/254 |
| 2002/0187790 A1* | 12/2002 | Papadimitriou et al. ...... 455/452 |
| 2002/0196770 A1* | 12/2002 | Lin ............................ 370/349 |
| 2003/0064725 A1* | 4/2003 | Niska ............................ 455/445 |
| 2003/0099255 A1* | 5/2003 | Kekki et al. ................... 370/469 |
| 2003/0128694 A1* | 7/2003 | Hundscheidt et al. ......... 370/352 |
| 2003/0137991 A1* | 7/2003 | Doshi et al. ................... 370/466 |
| 2003/0152048 A1* | 8/2003 | Soininen et al. .............. 370/328 |
| 2004/0095924 A1* | 5/2004 | Holur et al. ................... 370/352 |
| 2004/0156329 A1* | 8/2004 | Bck et al. ...................... 370/328 |
| 2004/0196966 A1* | 10/2004 | Bushnell .................... 379/88.19 |
| 2004/0203736 A1* | 10/2004 | Serna ......................... 455/426.1 |
| 2004/0203785 A1* | 10/2004 | Sundquist et al. ............ 455/436 |
| 2004/0204095 A1* | 10/2004 | Cyr et al. ...................... 455/560 |
| 2005/0078663 A1* | 4/2005 | Sylvain ......................... 370/352 |
| 2005/0159158 A1* | 7/2005 | Pardeep et al. ............... 455/436 |
| 2006/0140151 A1* | 6/2006 | Dantu et al. ................... 370/331 |
| 2007/0025312 A1* | 2/2007 | Smith ............................ 370/338 |
| 2007/0066270 A1* | 3/2007 | Dantu et al. ................... 455/331 |
| 2007/0093245 A1* | 4/2007 | Easley ........................... 455/433 |
| 2007/0115944 A1* | 5/2007 | Dantu et al. ................... 370/352 |

* cited by examiner

CONNECTIVITY PLANE ROUTING

This application claims the benefit of the filing date as provided in 35 U.S.C. 119 of EPO patent application number 02026957-7 filed on Dec. 4, 2002, the disclosures of which are incorporated herein by reference.

FIELD OF THE INVENTION

The present invention relates to communications networks that include network portions with a horizontally oriented network architecture. In particular, the invention relates to aspects that concern the routing of a message on a connectivity plane to a mobile terminal that can be reached via two or more network nodes.

BACKGROUND OF THE INVENTION

In the past, different communications networks like public land mobile networks (PLMN), public switched telephone networks (PSTN) and data/IP networks (e.g. the public Internet) have co-existed in the form of separate monolithic networks vertically aligned with respect to each other. In each of these monolithic networks, network control and connectivity, i.e., the transfer of user data, have traditionally been bundled.

Today, mobile communication is migrating toward $3^{rd}$ generation networks like the universal mobile telecommunication system (UMTS). In parallel with the migration toward $3^{rd}$ generation mobile networks, a network architecture that is based on horizontal planes replaces the traditional vertical network architectures. According to the horizontal approach of modern network architectures, the tasks of network control and connectivity are being split into different horizontal planes, namely a network control plane and a connectivity plane.

The connectivity plane is based primarily on cell- and packet-based data transfer technologies like the asynchronous transfer mode (ATM) and the Internet protocol (IP). An important task of the connectivity plane is to provide interfaces to present-day telecommunications networks—which are based on time-division multiplexing (TDM)—and to legacy networks, such as PSTN. Due to this interfacing task of the connectivity plane, network nodes are required that bridge between different transmission technologies and that add additional services (like bandwidth on demand) to end-user connections. Media gateways (MGW) as described in Magnus Fyrö et al, "Media gateway for mobile networks", Ericsson Review no. 4, 2000, 216 to 223, are a possible realization of such bridging nodes.

In context with the transmission toward horizontally oriented network architectures, conventional TDM network nodes like mobile services switching centers (MSCs), which traditionally include network control tasks and connectivity tasks in the same node, are separated into a MGW and a dedicated server component (MSC server). In conventional general packet radio service (GPRS) networks a similar migration takes place. The conventional serving GPRS support node (SGSN) is split into a MGW and a dedicated server component (SGSN server). Whereas in the network control plane the MSC server controls circuit-mode services and the SGSN server controls packet-mode services, a MGW in the connectivity plane may be common to both circuit-mode and packet-mode networks.

This situation is depicted in the exemplary network architecture depicted in FIG. 1. The upper half FIG. 1 corresponds to the network control plane including components like the MSC server or the SGSN server, whereas the lower half corresponds to the connectivity plane including components like MGWs. In FIG. 1, fine lines represent control connections captioned with the respective control protocol, and thicker lines represent data transfer connections.

In the exemplary scenario of FIG. 1, a call between an UMTS terrestrial radio access network (UTRAN) or a basestation subsystem (BSS) and a PSTN is interconnected by two different MGWs. MGW A interfaces the UTRAN and BSS and switches ATM or routes IP traffic. The MSC server and the SGSN server both have a control connection to UTRAN and BSS. MGW B interfaces the PSTN and is controlled using the H.248 control protocol by the MSC server and a gateway MSC (GMSC)/transit switching center (TSC) server.

If in a scenario as depicted in FIG. 1 a call is to be set up to a mobile terminal, different network nodes may be involved. Usually, the network nodes involved are determined by the network type from which the call originates and the network type in which the call terminates. In order to better understand the signalling involved in the set up of a call in the scenario depicted in FIG. 1, call set up within a PLMN, e.g. within a global system for mobile communication (GSM) network, is described first.

As is well known, for a mobile terminating call the number given by a calling party points to a record in a GSM home location register (HLR). Among other data, the HLR includes information relating to the current location of the mobile terminal which is called. More specifically, the HLR record for the called mobile terminal contains information necessary for finding the final destination of the call, i.e. the MSC to which the called mobile terminal is currently attached.

In order to set up a call toward a GSM user, this call is first routed to a GMSC, without any knowledge of the whereabouts of the called mobile terminal. The GMSC accesses the HLR of the called mobile terminal to obtain information about the MSC currently associated with this mobile terminal. The HLR then has to interrogate this MSC to obtain routing information. When being contacted by the HLR, the MSC generates routing information in the form of a roaming number chosen from a pool of free numbers, and links it temporarily to the called mobile terminal. The roaming number is given back via the HLR to the GMSC. Using the roaming number as an address, the GMSC can route the call to the MSC to which the mobile terminal is attached. Since this MSC has linked the roaming number to the called mobile terminal, the MSC can go ahead with the establishment of the call toward the called terminal.

If the call originates and terminates within a particular PLMN, none of the components depicted in FIG. 1 will be involved except for the PLNM. The situation is different if a call originating from e.g. a PSTN terminal terminates at a UMTS user equipment (UE). Although the basic principles of setting up a call are similar to those described above in context with GSM, additional network nodes like MGWs, GGSNs, etc. will get involved. Moreover, it is readily apparent that additional mechanisms with respect to the routing of messages for example on the connectivity plane have to be implemented.

Thus, there is a need for a concept for efficiently routing a connectivity plane messages to a mobile terminal.

SUMMARY OF THE INVENTION

As regards a method, this need is satisfied with respect to a mobile terminal that can be reached via two or more network nodes of a first type by the steps of receiving positional information indicating the geographical location of the mobile terminal and routing information associated with a network node of a second type to which the mobile terminal is attached, determining, based on the received positional information, the network node of the first type via which a connectivity plane message is to be routed to the mobile terminal, and routing the connectivity plane message to the mobile terminal via the determined network node of the first type. In the context of the present invention the connectivity plane is not regarded as a static layer but denotes a dynamic flow of information.

The network node of the first type via which the connectivity plane message is to be routed may be determined based on the received positional information in various ways. Possible determining approaches include mapping or selection mechanisms. Moreover, the positional information may readily specify the network node of the first type via which the connectivity plane message is to be routed to the mobile terminal. The latter case is of particular relevance if there is a correlation between the specified network node of the first type and the geographical location of the mobile terminal, e.g. because the network node of the first type closest to the mobile terminal is specified by the positional information.

The nodes of the first type are preferably arranged between two different transmission regimes. The geographical position of particular network node of the first type thus influences the routing of the connectivity plane message with respect to different transmission regimes. Since the network node of the first type via which the connectivity plane message is routed is determined in dependence of positional information indicating the geographical location of the mobile terminal, network resources utilized in individual transmission regimes may be selected in dependence on the geographical location of the mobile terminal. This allows for example to use available, non-occupied resources in terms of particular transmission regimes more efficiently.

The network nodes of the second type are preferably configured as switching nodes that co-ordinate the setting-up of calls to and from mobile terminals. According to a first variant of the invention, there is a fixed association between a particular geographical area and a particular network node of the second type. This means that every mobile terminal visiting the particular geographical area will automatically be associated with the particular network node of the second type assigned to this geographical area. According to a second variant of the invention, there is no such fixed association with respect to a single network node of the second type. In other words, a mobile terminal at a specific geographical location may be served by one of a plurality of different network nodes of the second type which all might potentially serve mobile terminal at its specific geographical location.

The positional information is preferably generated by the network node of the second type serving the called mobile terminal. The network node of the second type may belong to a circuit-switched or to a packet-switched network.

The network node of the second type advantageously also provides the routing information. The routing information may indicate the particular network node of the second type to which the mobile terminal is attached. In such a case the routing information may be used to contact the mobile terminal via the network node of the second type. However, this does not necessarily mean that the connectivity plane message is first routed to the network node of the second type and from there to the mobile terminal to which a call is to be set up. On the contrary, the connectivity plane message may bypass the network node of the second type to which the mobile terminal is attached. Preferably, however, at least a network control plane message associated with the particular mobile terminating call is routed to the network node of the second type to which the mobile terminal is attached. Similar to the connectivity plane, in the context of the present invention the network control plane is not regarded as a static layer but denotes a dynamic flow of information.

The positional information based on which the network node of the first type is determined may relate to various aspects of the geographical location of the mobile terminal. For example, the positional information may indicate a particular cell or particular location area, i.e. group of cells, in which the mobile terminal is currently located. Alternatively, the positional information may relate to a specific network component pointing to the geographical location of the mobile terminal, e.g. a MGW, a radio network controller (RNC) or a base station controller (BSC) to which the mobile terminal is or might be connected. Preferably, the positional information indicates the geographical location of the mobile terminal within an area served by a network node of the second type. This means that the positional information is preferably more precise than merely specifying the network node of the second type which serves the called mobile terminal.

Once a specific network node of the first type has been determined, not only messages on the connectivity plane, but also messages on the network control plane may be routed via this network node of the first type. Network control plane messages are advantageously routed via the determined network node of the first type to the network node of the second to which the mobile terminal is attached. The network node of the second type may then perform control signalling tasks with respect to the call. Preferably, the network control plane and the connectivity plane are split either in the determined network node of the first type or in a network node close to this network node.

The communications network via which connectivity plane messages are routed to the mobile terminal may be an inhomogeneous network including different transmission regimes. For example the communications network may include a first network portion having a split architecture and a second network portion having a monolithic architecture. The term monolithic denotes a network that has primarily a vertical network architecture, whereas the term split denotes a network that has primarily a horizontal network architecture. The network node of the first type may be arranged between the network portion having a split architecture and the network portion having a monolithic architecture.

As has been mentioned before, a network node of the first type may be determined out of the available network nodes of the first type such that the use of specific resources within the communications network is minimized. Such a minimization of resources may include selecting the network node of the first type which is closest to the current geographical location of the mobile terminal. Alternatively or additionally, the network node of the first type may be determined such that the total number of network nodes of the first type via which the connectivity plane will be routed is minimized to thus save network resources. According to a further aspect of the invention, the network node of the first type is determined such that resources utilized by the routed connectivity plane in the network portion having a split architecture are minimized.

The positional information may be included in the routing information. This approach is particularly advantageous in the case of routing information in the form of specific addresses like roaming numbers. In such a case the addresses may for example be allocated in series, each series indicating the geographical location of the mobile terminal or, which is considered to be equivalent, directly denoting the network node of the first type over which the connectivity plane message is to be routed to the called mobile terminal and which, in geographical terms, is closest to the mobile terminal. In this case the connectivity plane message may subsequently be routed depending on the particular series to which the allocated address belongs. The address may thus not only be used for routing toward the particular network node of the second type to which the mobile terminal is attached, but simultaneously includes information regarding the routing of the connectivity plane message to a particular network node of the first type which e.g. is closest to the access or which is up and running in the case a default network node of the first type is down. The latter adds some redundancy if a network node of first time goes down.

If the positional information is included in the routing information, the positional information may be derived from the received routing information in various ways. Preferably, a look-up table (i.e., routing table) is used to determine for received routing information including the positional information directly the network node of the first type via which the connectivity plane message is to be routed. In addition to indicating a particular network node of the first type via which the connectivity plane message is to be routed, the look-up table may specify the transmission regime via which the connectivity plane message is to be routed to the particular network node of the first type. For example it may be specified that the connectivity plane message has to be routed via one of an ATM network and a TDM network to the particular network node of the first type.

As an alternative to including the positional information in the routing information, the positional information may be generated, transmitted and received separately from the routing information. For example, the positional information may separately be transmitted in context with message application part (MAP) signalling.

As has been described above, the positional information may be assessed to determine the network node of the first type via which the connectivity plane message is to be routed to the mobile terminal. Thus, the positional information allows to determine a certain target network node of the first type. In many cases it is advantageous to not only specify the target network node of the first type but to additionally specify a particular transmission regime, e.g. a specific network type like ATM or TDM, via which the connectivity plane message is to be routed to the target network node of the first type. Thus, corresponding transmission information may be received in addition to the positional information. Alternatively, such transmission information may be determined based on the received routing information or positional information by means of e.g. a mapping operation.

So far, aspects of the invention in context with a network component have been described that is configured to select the network node of the first type via which the connectivity plane message is to be routed to the mobile terminal. According to a complementary aspect of the invention, the positional information has to be generated and transmitted to the network component that has the task of determining the network node of the first type. Thus, the invention also relates to a method of controlling the routing of a connectivity plane message to a mobile terminal, the method comprising the steps of receiving a request for routing information, generating positional information indicating the geographical location of the mobile terminal and routing information associated with the network node of the second type to which the mobile terminal is attached, and, in response to receipt of the request for routing information, transmitting the routing information and the positional information to enable a receiving component to determine based on the received positional information the network node of the first type via which the connectivity plane message is to be routed. This method is preferably performed by the network node of the second type described above.

The receiving component to which the routing information and the positional information are sent may handle the routing information and the positional information in various ways. For example the receiving component may only use the routing information and not consider the positional information further. Alternatively, the receiving component may assess the positional information to determine the network node of the first type via which the connectivity plane is to be routed as has been described above. If the receiving component receives transmission information in addition to the routing information and the positional information, the receiving component may or may not utilize the transmission information for determining the transmission regime toward the target network node of the first type as mentioned before.

The invention can be implemented as a hardware solution or as a computer program product comprising program code portions for performing the steps of the invention when the computer program product is run on an computing device. The computer program product may be stored on a data carrier in fixed association with or removable from the computing device.

As regards the hardware solution, the invention is directed to a component for routing in a communications network a connectivity plane message to a mobile terminal which can be reached via two or more network nodes of the first type, the component comprising a first interface, a determination component, and a second interface. The first interface is configured to receive positional information indicating the geographical location of the mobile terminal and routing information, the routing information being associated with a network node of the second type to which the mobile terminal is attached. The determination component is adapted for determining based on the positional information the network node of the first type via which the connectivity plane message is to be routed to the mobile terminal, and the second interface allows routing of the connectivity plane message to the mobile terminal, via the selected network node of the first type. In the case the positional information is included in the routing information, the component may further include a unit for extracting the positional information from the routing information.

As regards a complementary aspect of the invention, the invention is directed to a component for controlling the routing of a connectivity plane message to a mobile terminal which can be reached via two or more network nodes of a particular type and which is attached to the controlling component, the controlling component comprising a first interface, a processing component and a second interface. Via the first interface a request for routing information is received. The processing component generates positional information indicating the geographical location of the mobile terminal, and, additionally, routing information associated with the controlling component to which the mobile terminal is attached. The second interface is configured to transmit the routing information and the positional information to enable a receiving component to determine the network node of the particular type via which the connectivity plane message is to be routed to the mobile terminal.

BRIEF DESCRIPTION OF THE DRAWINGS

In the following the invention will be described with reference to an exemplary embodiment illustrated in the accompanying figures, in which.

DETAILED DESCRIPTION OF A PREFERRED EMBODIMENT

In the following description, for purposes of explanation and not limitation, specific details are set forth such as a particular embodiment relating to particular network nodes, particular signals, etc. in order to provide a thorough understanding of the present invention. It will be apparent to one skilled in the art that the present invention may be practiced in other embodiments that depart from these specific details. In particular, while the embodiment is described in context with a call originating from a fixed line terminal and terminating at an UE, the present invention is not limited to such an implementation, but for example can be utilized to set up a call originating from and/or terminating at other terminals and being transmitted via other transmission regimes. Moreover, those skilled in the art will appreciate that the functions explained herein below may be implemented using individual hardware circuitry, using a software functioning in conjunction with a programmed microprocessor or general purpose computer, using an application specific integrated circuit (ASIC) and/or using one or more digital signal processors (DSPs).

Figure 1:
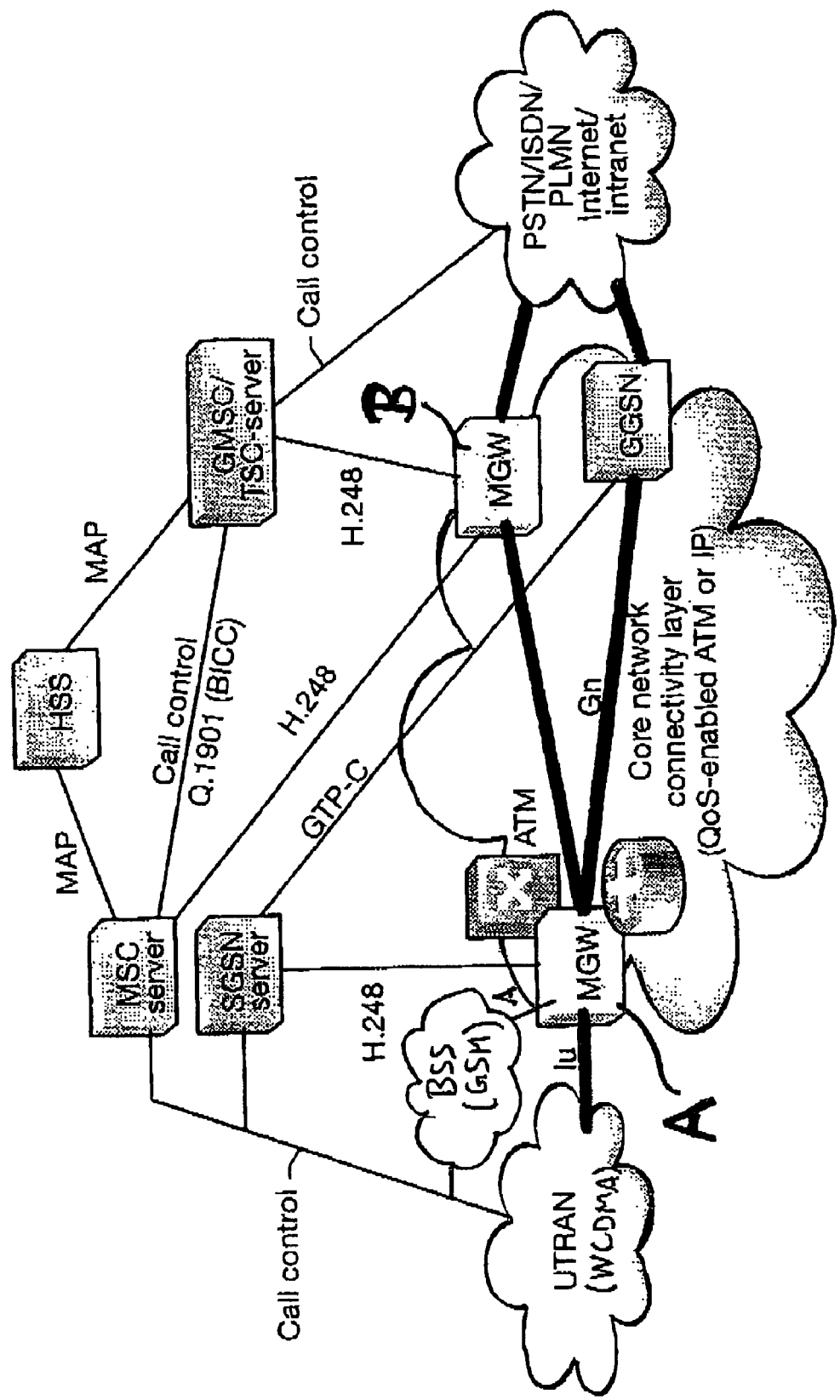
FIG. 1 is a block diagram of a primarily horizontally oriented network architecture known in the art.
Figure 2:
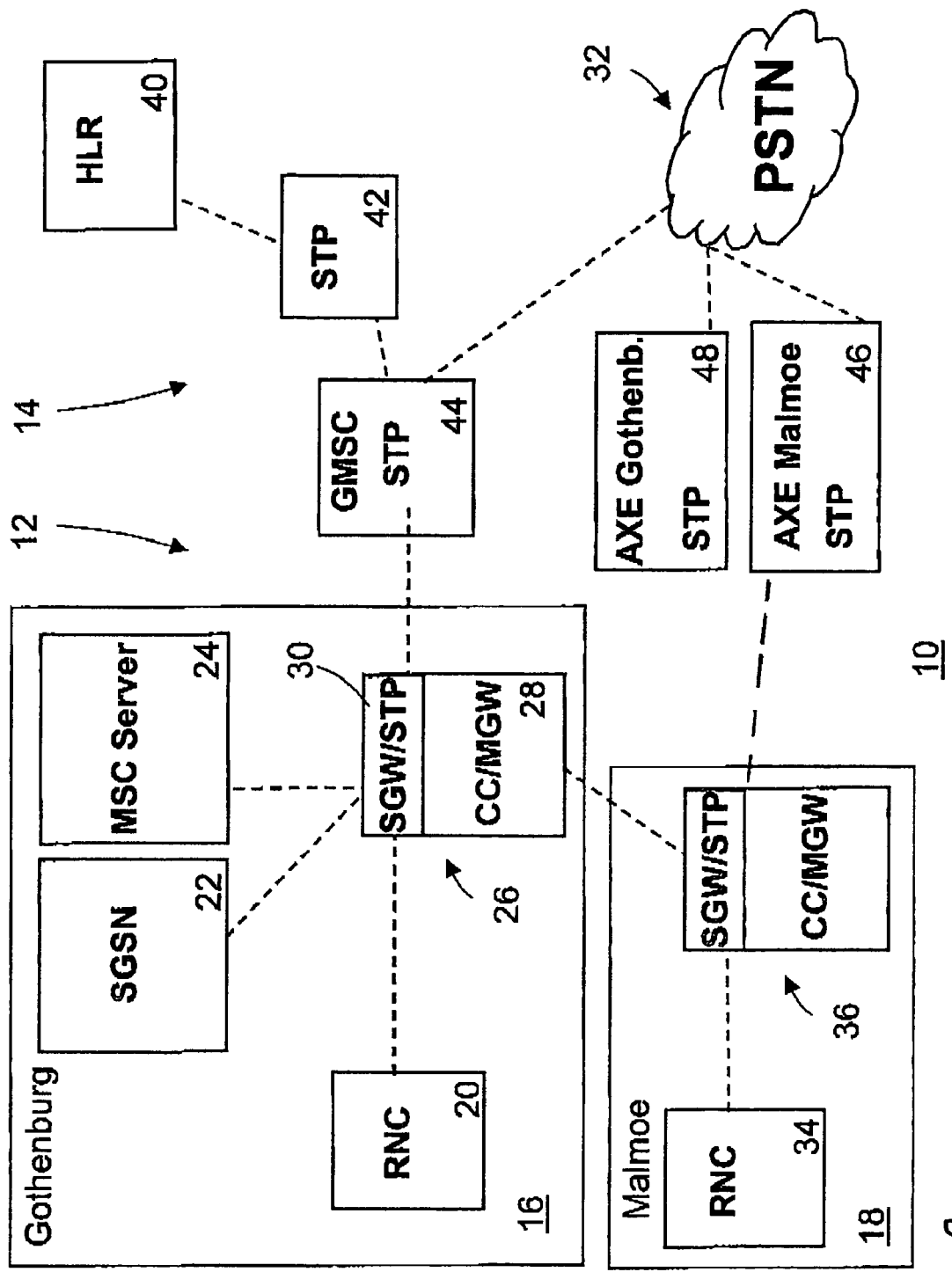
FIG. 2 shows a primarily horizontally oriented network architecture in which the invention can be implemented.

The invention can be practiced in any horizontally oriented network architecture like the architecture depicted in FIG. 1, that at least in portions allows a separate routing of a network control plane message and a connectivity plane message. In the following the invention will be described in context with the exemplary network architecture depicted in FIG. 2. The network architecture depicted in FIG. 2 is derived from the network architecture of FIG. 1 and specifies some of the network components of FIG. 1 in more detail. It should be noted that for clarity reasons the connectivity plane is not explicitly shown in FIG. 2.

The communications network 10 shown in FIG. 2 includes a first network portion 12 with a split architecture and a second network portion 14 with a monolithic architecture. In the embodiment depicted in FIG. 2 the split network 12 comprises UTRAN functionality and includes a first plurality of network components 16 arranged in Gothenburg and a second plurality of network components 18 located in Malmoe. Individual ones of the network components of the split network 12 and the monolithic network 14 are configured to communicate with each other using appropriate interfaces and communication protocols. This is indicated by dotted lines.

The split network portion 16 in Gothenburg includes an RNC 20, a SGSN 22, an MSC server 24 and a combined network node 26 acting both as signalling gateway (SGW) 30 and as media gateway 28. The combined network node 26 is an expression of the fact that in many cases user data streams on the connectivity plane and signalling on the network control plane share the same physical lines up to the MGW 28. The SGW is thus needed to convey the signalling across different transmission regimes.

Assume, for example, that call control messages have to be exchanged for a call that spans an IP-based core network (not depicted in FIG. 2) and a PSTN 32 of the monolithic network 14. In such a case the control messages are set up between individual servers, but the call is transmitted through the combined network node 26 including MGW functionality. Thus, the SGW 30, which is configured to provide signalling interworking between IP, ATM, and TDM networks, is co-located with the MGW 28. The SGW 30 has signal transfer point (STP) functionality in order to relay signalling system no. 7 (SS7) messages over the messages transfer part in TDM and ATM networks as well as over the stream control transport protocol in IP networks.

The MGW 28 co-located with the SGW 30 in the combined network node 26 fullfills cross connect (CC) functions, e.g. with respect to relaying signalling messages to the MSC server 24.

The split network portion 18 located in Malmoe comprises an RNC 32 and a combined network node 34 similar to the ones described above in context with the split network portion 16 located in Gothenburg.

In addition to the PSTN 32 that has already been mentioned above, the monolithic network 14 on the right-hand side of FIG. 2 includes a plurality of TDM network components like an HLR 40, an STP 42, a GMSC 44 with STP functionality, and fixed line AXE switches 46, 48 with STP functionality located in Malmoe and Gothenburg, respectively.

Figure 3:
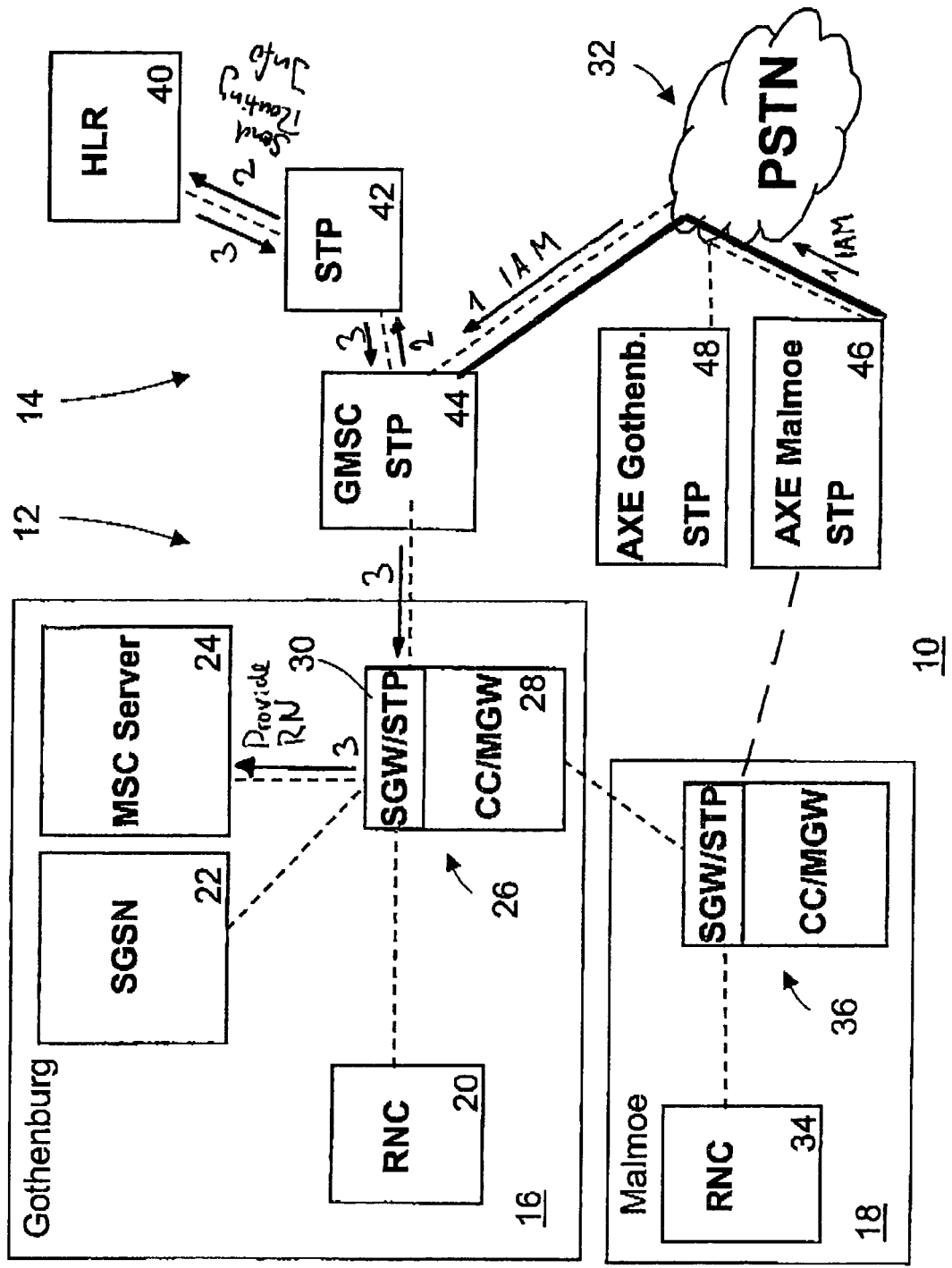
FIGS. 3, 4 show the steps involved in setting up a UE terminating call prior to routing of a connectivity plane message to the UE.
Figure 4:
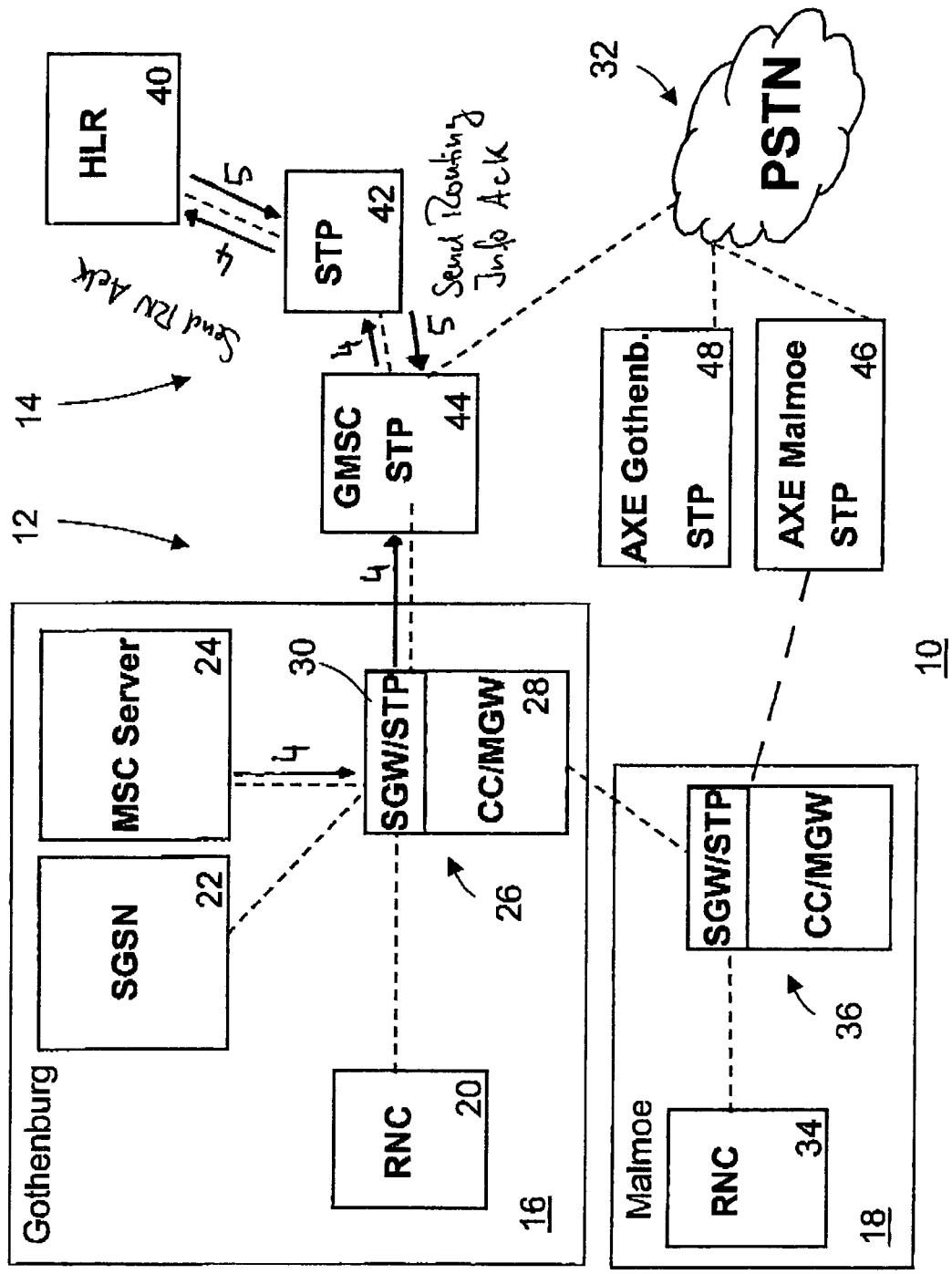

In the following, a set up of a call from a fixed subscriber attached to the AXE fixed line switch 46 in Malmoe to a wideband code division multiple access (WCDMA) UE attached to RNC 34 in Malmoe will be described with reference to FIGS. 3 and 4. In FIGS. 3 and 4, thin lines with arrow heads denote routing of the network control plane messages (i.e., network control signalling), whereas thick lines denote routing of connectivity plane messages (i.e., routing of user data).

When the fixed subscriber wishes to set up a call, an integrated services digital network (ISDN) user part (ISUP) IAM (initial access message) is sent from the fixed line switch 46 via the PSTN 32 to the GMSC 44 (arrow 1). Simultaneously, connectivity plane messages (thick line) are routed from the fixed line switch 46 via the PSTN 32 to the GMSC 44.

In response to receipt of the IAM message, the GMSC 44 requests routing information (roaming number, RN) from the HLR 40 using a Send Routing Info message (arrow 2). In the records of HLR 40 associated with the called UE, information about the MSC server 24 visited by the called UE is stored. It should be noted that depending on the specific network type visited by the UE, two or more MSC servers 24 might potentially be responsible for the UE.

In response to receipt of the Send Routing Info message from the GMSC 44, the HLR searches its record of the called UE for the MSC server 24 to which the UE is currently attached. The HLR 40 then sends a Provide Roaming Number message via the combined network node 26, i.e. via the SGW 30, to the MSC server 24 (arrow 3).

Upon receipt of the Provide Roaming Number message the MSC server 24 determines the geographical location of the called UE. To that end the MSC server 24 determines the location area (LA) in which the called UE is located. Thus, the MSC server 24 determines that the called UE is located in the Malmoe area and attached to RNC 34. In a next step the MSC server 24 chooses the RN for the particular access from a pool of RNs and links the chosen RN temporarily to the called UE.

The pool of RNs assigned to the particular MSC server 24 is divided into a plurality of RN series, each RN series being associated with a particular LA served by the MSC server 24.

Thus, the RN chosen by the MSC server 24 is indicative of the geographical location of the called UE within the area served by the MSC server 24. In other words, by taking an RN out of a particular series associated with the geographical location of the UE, the MSC server 24 generates positional information that is included in the RN, i.e. included in the routing information.

It should be noted that the above approach for generating positional information has only been described for illustrative purposes. Other approaches could be used as well. For example instead of associating series of RNs with individual LAs, each series of RNs could be associated with e.g. an MGW, RNC or BSC to which the called UE may potentially be connected when served by the MSC server 24. Moreover, instead of including positional information in the routing information by allocating RNs in series, the positional information could be generated and transmitted independently from the routing information. For example, the positional information could be transmitted as a dedicated message in the Provide RN MAP procedure which is currently described. Additionally, the MSC server 24 may generate and transmit transmission information that can be used by the GMSC 44 to determine the network type (e.g. ATM or TDM) via which a target MGW as determined by the GMSC 44 on the basis of the positional information is to be reached.

Once the MSC server has chosen an RN appropriate for the geographical location of the UE, the RN is sent back to the HLR 40 with a Provide RN Ack message as depicted in FIG. 4 (arrow 4). The HLR 40 sends the RN with a Send Routing Info Ack message back to the GMSC 44 (arrow 5).

The GMSC 44 receives the routing information, i.e. the RN, including the positional information. The GMSC 44 then assesses the RN using an internal look-up table which associates particular RNs or particular series of RNs with particular MGWs which—taking into account the geographical location of the called UE—may be used for routing connectivity plane messages to the called UE.

The internal look-up table of the GMSC 44 may be configured in various ways. It may for example point to the MGW which is closest to the LA where the UE is registered. Instead of a look-up table, the GMSC 44 could include an alternative component for selecting based on the positional information the MGW via which a connectivity plane message is to be routed to the UE. An alternative selection mechanism for the MGW could be implemented as well. Instead of selecting the MGW closest to the LA where the UE is registered, the positional information received by the GMSC 44 may be used e.g. to introduce redundancy for UE terminating calls in the case a default MGW is not operating.

Figure 5:
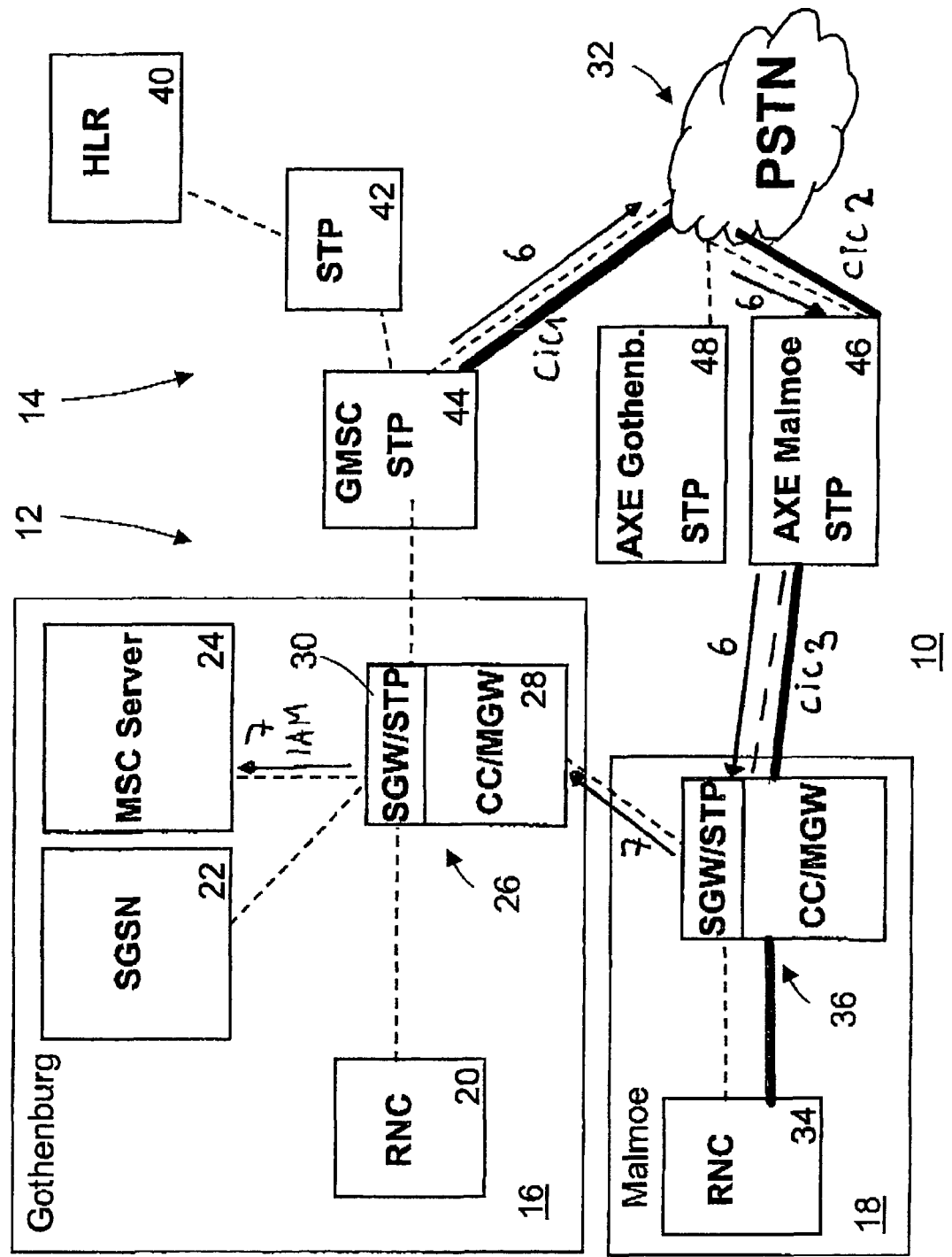
FIG. 5 shows the routing according to the invention of the connectivity plane message after the signalling depicted in FIGS. 3 and 4 has been performed.

In the present embodiment as depicted in FIGS. 2 to 5, the GMSC 44 extracts from the RN positional information pointing to the MGW of the combined network node 36 located in Malmoe, i.e. in the same geographical area in which the called UE is located. The GMSC 44, using its routing function, sends the ISUP IAM thus via the PSTN 32 and the fixed line switch 46 in Malmoe to the MGW of the combined network node 36 in Malmoe. By this, the ISUP connectivity plane is also connected to this MGW in Malmoe as depicted in FIG. 5 (arrow 6).

The ISUP network control plane and the ISUP connectivity plane are split in the combined network node 36. Whereas ISUP connectivity plane messages are routed further to the RNC 34 to which the called UE is attached, ISUP network control plane messages are routed over the SGW/STP of the combined network node 36 in Malmoe and over the SGW/STP 30 of the combined network node 26 in Gothenburg to the MSC server 24 in Gothenburg servicing the called UE (arrow 7). Alternatively, ISUP network control plane messages could be cross connected in the CC/MGW of the combined network node 36 in Malmoe and the corresponding CC/MGW 28 of the combined network node 26 in Gothenburg to the MSC server 24 in Gothenburg.

As becomes apparent from FIG. 5, ISUP connectivity plane messages (thick lines) are primarily routed within the Malmoe area via the fixed line switch 46, the combined network node 36 and the RNC 34, all located in Malmoe, to the called UE. Such a routing is very efficient in terms of e.g. using non-occupied network resources compared to the case in which no positional information regarding the geographical location of the UE is provided. If no positional information was available to the GMSC 44, it would route ISUP connectivity plane messages via the MGW 28 located in Gothenburg and the MGW of the combined network node 36 located in Malmoe, utilizing much more network resources.

The invention is in particular beneficial for network operators because they can route a mobile terminating call depending on the geographical location of the mobile terminal. By this, the network operators can to a certain extent control the traffic over particular network nodes and transmission regimes. If for example an individual network operator has to route a mobile terminating call in part via a proprietary network and in part via a shared network, by practicing the invention the network operator may utilize his proprietary network as much as possible such that e.g. connectivity plane messages enters the shared network at the MGW that is closest to the called mobile terminal. Thus, network resources in the shared network may be spared.

While the present invention has been described with respect to a particular embodiment, those skilled in the art will recognize that the present invention is not limited to the specific embodiment described and illustrated herein. Therefore, while the present invention has been described in relation to a preferred embodiment, it is to be understood that this disclosure is only illustrative. Accordingly, it is intended that the invention be limited only by the scope of the claims attended hereto.

The invention claimed is:

1. A method in a communication network, having a network control plane and a connectivity plane, of routing a connectivity plane message via the connectivity plane in a call to a mobile terminal which can be reached at a same radio access via two or more Media Gateways (MGWs) of a radio access network, the method comprising the steps of:
   routing the connectivity plane message separately from an associated network control plane message;
   determining positional information, that indicates a geographical location of the mobile terminal, by a Mobile Switching Center Server (MSC Server) to which the mobile terminal is attached, and routing information, the routing information being associated with the MSC Server;
   based on the positional information, selecting one of the two or more MGWs of the connectivity plane via which the connectivity plane message is to be routed to the mobile terminal; and
   routing the connectivity plane message to the mobile terminal via the selected MGW of the connectivity plane.

2. The method of claim 1, wherein the positional information indicates the geographical location of the mobile terminal within an area served by the MSC Server.

3. The method of claim 1, wherein a network control plane message is routed via the selected MGW to the MSC Server.

4. The method of claim 1, wherein routing of the connectivity plane message is performed in a communications network that includes a first network portion having a split architecture and a second network portion having a monolithic architecture.

5. The method of claim 4, wherein the selected MGW is arranged between the first network portion and the second network portion.

6. The method of claim 4, wherein the selected MGW is selected such that resources utilized by the routed connectivity plane message in the first network portion are minimized.

7. The method of claim 1, wherein the positional information is included in the routing information.

8. The method of claim 1, wherein the positional information is received separately from the routing information.

9. The method of claim 1, further comprising the step of determining, based on the positional information or receiving transmission information specifying the transmission regime, via which the connectivity plane message is to be routed to the selected MGW.

10. The method of claim 1, wherein the two or more Media Gateways (MGWs) are combined network nodes, each combined network node comprising a Media Gateway (MGW) and a Signaling Gateway (SGW).

11. The method of claim 1, wherein the selected MGW of the connectivity plane is the MGW closest to the mobile terminal.

12. A method of controlling the routing of a connectivity plane message in a call to a mobile terminal via a connectivity plane which can be reached at a same radio access system via two or more Media Gateways (MGWs) of a radio access network and which is attached to a Mobile Switching Center Server (MSC Server), the method comprising the steps of:
 receiving a request for routing information;
 generating positional information, by the MSC Server to which the mobile terminal is attached, indicating the geographical location of the mobile terminal and routing information associated with the MSC Server to which the mobile terminal is attached;
 transmitting a preferred routing using the positional information; and
 choosing one of the two or more MGWs through which the connectivity plane message is routed to the mobile terminal.

13. A network component, in a communication network comprising a network control plane and a connectivity plane, for routing a connectivity plane message via the connectivity plane in a call to a mobile terminal attached to the network component and which can be reached at a same radio access system via two or more Media Gateways (MGWs) of a radio access network, the network component comprising:
 a first interface for receiving a request for routing information, the routing information being associated with a Mobile Switching Center Server (MSC Server) of the network control plane to which the mobile terminal is attached;
 a processing component for generating positional information indicating the geographical location of the mobile terminal, for routing the connectivity plane message to the mobile terminal; and providing routing information associated with the network component; and
 a second interface for transmitting positional information and the routing information for a receiving network switch to select one of the two or more MGWs via which the connectivity plane message is to be routed to the mobile terminal.

14. The network component of claim 13, wherein the two or more network nodes are combined network nodes, each of which comprise a Media Gateway (MGW) and a Signaling Gateway (SGW).

15. A method, in a communication network employing a network control plane and a connectivity plane, of routing a connectivity plane message via the connectivity plane in a call to a mobile terminal that can be reached at a same radio access system via two or more MGWs of a radio access network, the connectivity plane message being routed separately from an associated network control plane message, the method comprising the steps of:
 determining a geographic location of the mobile terminal, with respect to the two or more MGWs of the connectivity plane;
 receiving routing information associated with a Mobile Switching Center Server (MSCS) of the network control plane to which the mobile terminal is attached;
 using positional information of the mobile terminal to choose one of the MGWs of the connectivity plane via which the connectivity plane message is routed to the mobile terminal; and
 routing the connectivity plane message to the mobile terminal via the chosen MGW of the connectivity plane.

16. A network component, in a communication network comprising a network control plane and a connectivity plane, for routing a connectivity plane message via the connectivity plane in a call to a mobile terminal which can be reached at a same radio access system via two or more Media Gateways (MGWs) of a radio access network, the network component comprising:
 a first interface for receiving positional information indicating geographical location of the mobile terminal and routing information associated with an MSC Server to which the mobile terminal is attached;
 a determination component for determining, based on the positional information, one of the two or more MGWs via which the connectivity plane message is to be routed to the mobile terminal; and
 a second interface for routing the connectivity plane message to the mobile terminal via the determined one of the two or more MGWs.

17. The network component of claim 16, further comprising a component for extracting the positional information from the routing information.

* * * * *